(12) United States Patent
Medebach et al.

(10) Patent No.: US 6,192,632 B1
(45) Date of Patent: Feb. 27, 2001

(54) INTERIOR PANELING ELEMENT FOR A MOTOR VEHICLE DOOR

(75) Inventors: Thomas Medebach, Wetzlar-Dudenhofen; Andreas Gutermuth, Angelburg, both of (DE)

(73) Assignee: Kuster & Co. GmbH, Ehringshausen (DE)

( * ) Notice: Subject to any disclaimer, the term of this patent is extended or adjusted under 35 U.S.C. 154(b) by 0 days.

(21) Appl. No.: 09/323,126

(22) Filed: Jun. 1, 1999

(30) Foreign Application Priority Data

Jun. 2, 1998 (DE) .............................................. 198 24 339

(51) Int. Cl.$^7$ ........................................................ B60J 5/04
(52) U.S. Cl. ........................... 49/502; 296/146.7; 296/152
(58) Field of Search ........................... 49/502; 296/146.5, 296/146.7, 152

(56) References Cited

U.S. PATENT DOCUMENTS

| | | | |
|---|---|---|---|
| 4,662,115 | * 5/1987 | Ohya et al. | 49/502 |
| 5,095,659 | * 3/1992 | Benoit et al. | 49/502 |
| 5,226,259 | * 7/1993 | Yamagata et al. | 49/502 |
| 5,251,403 | * 10/1993 | Compeau et al. | 49/502 |
| 5,408,785 | * 4/1995 | Heim et al. | 49/502 |
| 5,548,930 | * 8/1996 | Morando | 49/502 |
| 5,573,297 | * 11/1996 | DeRees et al. | 49/502 X |
| 5,855,096 | * 1/1999 | Staser et al. | 49/502 X |
| 5,937,584 | * 8/1999 | Salmonowicz et al. | 49/352 X |

* cited by examiner

Primary Examiner—Jerry Redman
(74) Attorney, Agent, or Firm—Liniak, Berenato, Longacre & White

(57) ABSTRACT

An interior paneling element (1) for a motor vehicle door (10) is described, which element is designed as a bearer of functional units or parts (11). At least some of the functional units or parts (11), in particular the cavity-reinforcement means (2), the guide rail (3, 4) of the window opener and optionally a strut of the side-impact protection (5) are fastened on the element (1) in the form of a static framework (12).

18 Claims, 2 Drawing Sheets

INTERIOR PANELING ELEMENT FOR A MOTOR VEHICLE DOOR

BACKGROUND OF THE INVENTION

1. Field of the Invention

The invention relates to an interior paneling element for a motor vehicle door.

2. Description of the Related Art

DE 195 09 282 A1 has already disclosed a motor vehicle door consisting of a twin-shell bodyshell door having an outside door panel and an inside door panel. The panels are connected to each other in the edge region, the inside door panel having a section which is essentially covered by a bearing plate having functional units, such as a window opener, a lock, cable tree or the like, fitted on it. The door is closed off with respect to the inside by an interior paneling element. At least part of the interior paneling element is prefitted to the bearing plate.

DE 196 20 148 A1 discloses a vehicle door consisting of an outside door panel as a component of the vehicle body, a unit bearer for accommodating functional elements, an interior paneling shell and a movable window pane. The unit bearer divides the door interior into a door cavity toward the outside door panel and into a functional space toward the interior paneling shell. In this case, the window pane is arranged in the door cavity. The unit bearer, the functional elements, the interior paneling shell and also the window pane and its guide elements form a modular installation unit. The unit bearer, which covers the entire functional space and has integrated fastening elements for the interior paneling shell, consists of a dimensionally stable fiber reinforced material having internal friction increased by the embedding of the fibers and having increased impact resistance.

A peripheral, exchangeable linear seal, which follows the contour of the unit bearer, seals the functional space off from the door cavity in a moisture-repelling manner. The functional elements are arranged in the functional space in cup-like, recessed moldings of the unit bearer.

A disadvantage of this prior art is the fact that the production and assembly costs of these vehicle doors which are already constructed in a modular form continue to be quite high. Furthermore, the weight of the vehicle door is also increased because of the use of a bearing plate accommodated in the door interior.

In contrast, the present invention is based on the object of specifying an interior paneling element for a motor vehicle door, the production and assembly costs and also the weight of the motor vehicle door being reduced.

SUMMARY OF THE INVENTION

According to the invention, this object is essentially achieved in that the interior paneling element itself is designed as a bearer of functional units or parts, such as, for example, a window opener with a guide rail for a window pane, a lock, an inside-door operating means, a mirror-adjustment means, side-impact protection, a cavity-reinforcement means, loudspeaker or the like.

This measure makes it possible to dispense with the use of a separate bearing plate which is accommodated in the interior of the vehicle door and is intended for the functional units or parts. The essential functional units or parts of the vehicle door are attached to the interior paneling element itself, so that the use of an additional bearer can be dispensed with. As a result, not only is the number of parts required for the vehicle door and also the weight of the vehicle door reduced but also the assembly procedure for completing the motor vehicle door on the assembly line of the motor vehicle manufacturer is simplified.

According to a first, particularly advantageous development of the invention, at least some of the functional units or parts, in particular the cavity-reinforcement means, the guide rail of the window opener and optionally a strut of the side-impact protection are fastened on the element in the form of a static framework. In this respect, the stiffness of the interior paneling element, which can be designed, for example, as a shell-like body or the like, is reinforced by means of at least some of the functional units or parts and the stiffness of the element as a whole is increased. The stiffness which is required for the interior paneling element can be ensured, according to the particular application, by the individual, specific arrangement and design of the functional units or parts. For this purpose, individual matching of the design of the interior paneling element and of the functional units or parts fastened on the interior paneling element, which design may vary according to the particular application, is required. In any event, however, the stiffness of the interior paneling element is not determined solely by the construction and design of the element but also by the functional units or parts fastened on the element or connected to said element.

Furthermore, it has proven advantageous for at least the cavity-reinforcement means and/or the strut of the side-impact protection [lacuna] are connected, in particular directly, to the element, so that already by this means an increased stiffness of the element is ensured.

According to a further, particular refinement of the invention, it is of advantage if the one or more guide rails, which are essentially transversely directed, i.e. are essentially perpendicularly directed in the installation position, are connected to the cavity-reinforcement means, which is essentially longitudinally directed, i.e. is essentially horizontally directed in the installation position. By virtue of this essentially U-shaped arrangement of some of the functional units or parts on that side of the interior paneling element which faces toward the door interior, it is possible already for very great stiffness or load-bearing capacity of the element to be attained.

The one or more guide rails are connected to the element, optionally with the interconnection of spacer elements, in the region of the lower free sections.

It is furthermore advantageous for one or more guide rails to be connected to the essentially diagonally directed strut of the side-impact protection, so that the cavity-reinforcement means, the two guide rails and the strut of the side-impact protection form a type of frame construction which is coupled fixedly to the element.

It is of advantage for the element to consist of dimensionally stable plastic or fiber reinforced material.

According to another embodiment of the invention, the cavity-reinforcement means and/or the strut of the side-impact protection and/or the one or more guide rails [lacuna] are connected to the element by screws, clips, bonding or the like.

The invention also relates to an element according to the invention in combination with a motor vehicle door, the element being connected in a sealing manner to the motor vehicle door and forming a partition between the wet space and the dry space.

In this case, it may prove to be advantageous in the individual case for one or more functional parts, connected to the element, such as, for example, the cavity-reinforcement means, the strut of the side-impact protection or the like, additionally to be secured on the motor vehicle door or to be connected to the latter. For example, when the element is placed onto the motor vehicle door for assembly purposes, the free end sections of the abovementioned parts or units can engage into holders, couplings or the like provided on the motor vehicle door, so that the framework or the frame construction, connected to the element, is secured on the motor vehicle door via further fastening or fixing points.

Further aims, advantages, features and application possibilities of the present invention emerge from the following description of an exemplary embodiment, which is illustrated in more detail in the drawing. All of the features described and/or shown pictorially form the subject matter of the invention in themselves or in any desired, sensible combination, irrespective also of their combination in the claims or reference back to preceding claims.

DETAILED DESCRIPTION OF THE PREFERRED EMBODIMENT

Figure 1:
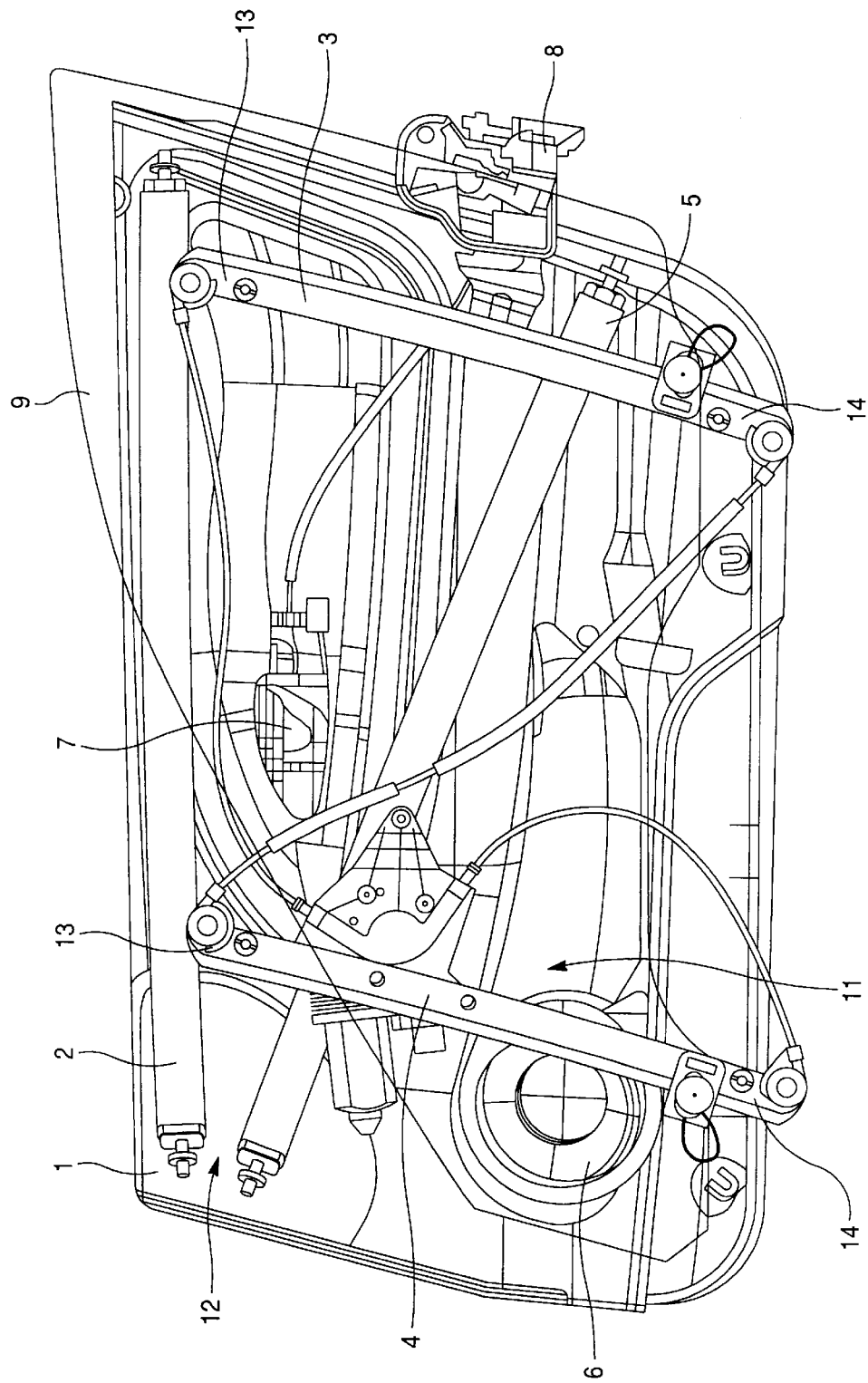
FIG. 1 shows an exemplary embodiment of an interior paneling element according to the invention for a motor vehicle door, in the unfitted state.

According to FIG. 1, the interior paneling element interior panel 1, which can be designed, for example, as wall or shell elements, has functional parts 11, for example a cavity-reinforcement means 2, guide rails 3, 4 of a window opener and optionally a strut of the side-impact protection 5. In this case, these functional parts 11 are advantageously arranged in the form of a static framework 12. In the exemplary embodiment selected here, the cavity-reinforcement means 2 and/or the side-impact protection 5 are connected directly to the interior paneling element 1, for example by clips, screws, bonding or the like. On the cavity-reinforcement means 2, essentially running in the horizontal direction, the guide rails 3, 4 of the window opener are connected, at a lateral distance from one another, by their upper sections 13. The lower sections 14 of the guide rails 3, 4 are connected to the interior paneling element 1, optionally via spacer elements. It goes without saying that further fixing points can be provided between the guide rails 3, 4 and further functional parts 11 of the element 1.

Additional reinforcement of the interior paneling element 1 is ensured by a strut of the side-impact protection 5 likewise being connected to the element 1, the strut furthermore also being connected to the guide rails 3, 4. Loudspeaker 6, the inside-door operating means 7, the lock 8 and optionally a mirror-adjustment means or the like can furthermore be arranged on the element 1.

Figure 2:
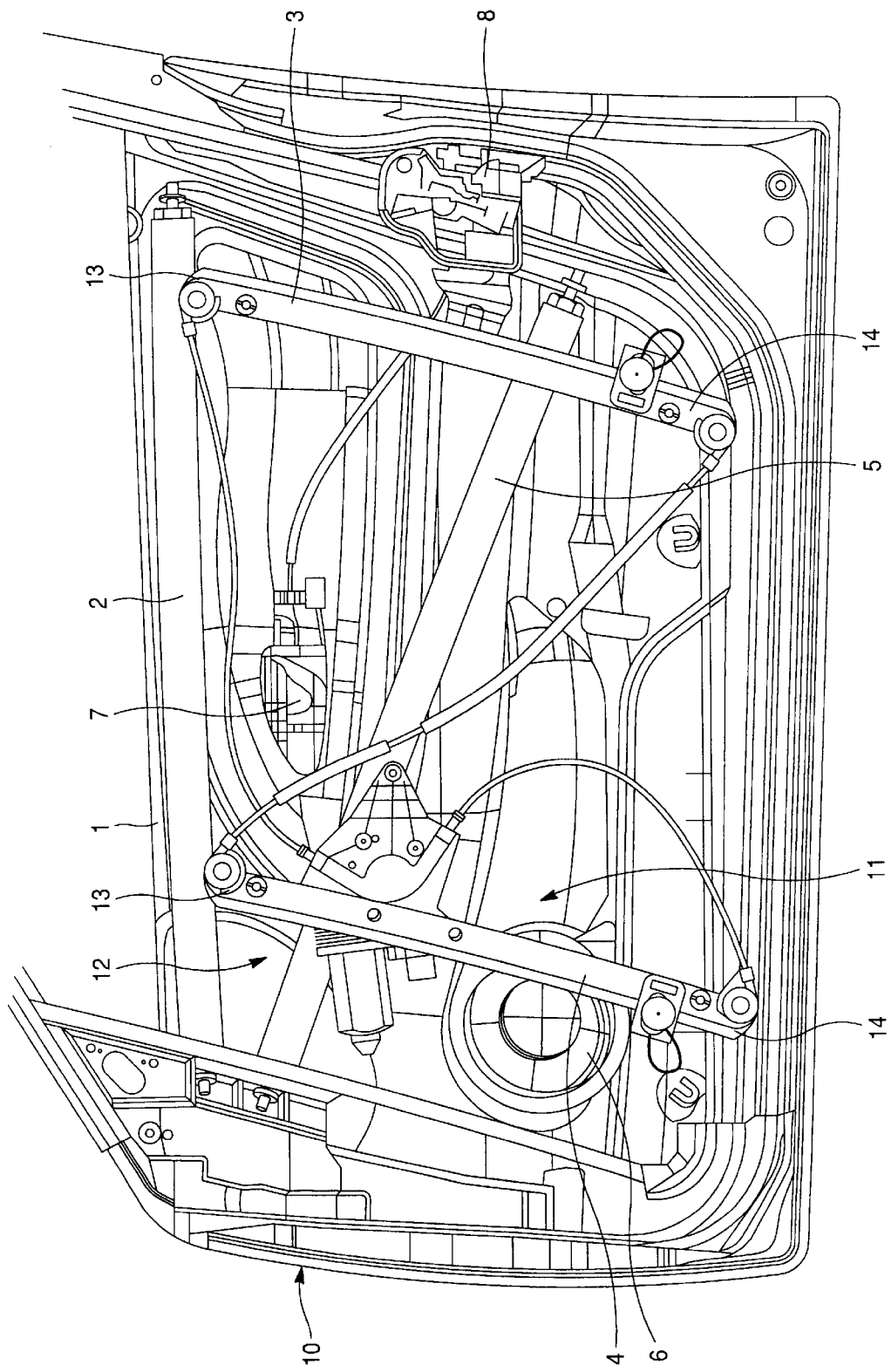
FIG. 2 shows a motor vehicle door with a fitted interior paneling element according to FIG. 1, the outside door skin of the motor vehicle door not being shown.

An interior paneling element 1 which is preassembled according to FIG. 1 and has the window pane 9 held in the guide rails 3, 4 is connected to the unmachined door, or is fitted thereto, on the motor-vehicle manufacturer's assembly line, as is shown in FIG. 2.

Overall, the use of the interior paneling element 1 according to the invention results in effective and rapid assembly on the motor-vehicle manufacturer's assembly line, with not only working time being saved but also the use of material, and consequently the weight of the motor vehicle door, being reduced to a considerable extent. Furthermore, the particular, individual arrangement of the functional parts 11 on the interior paneling element 1 ensures a great stiffness of the element 1, which is preferably produced from dimensionally stable plastic or fiber reinforced material. After assembly, the element 1 is connected in a sealing manner to the motor vehicle door 10 and thus forms a partition between the wet space and the dry space of the motor vehicle door 10.

It is advantageous if functional parts 11, which are connected to the element 1, are connected not only to the element 1 itself but also, after the element 1 is installed on the motor vehicle door 10, are connected to the motor vehicle door 10 or are secured on the latter. For this purpose, for example the free end sections of the cavity-reinforcement means 2, of the strut of the side-impact protection 5 or else of other functional parts 11 can enter, during installation of the element 1 on the motor vehicle door 10, into holders or the like provided on the motor vehicle door 10, so that after installation of the element 1 and of the motor vehicle door 10, a compact structure having extremely great stiffness or resistance is obtained.

What is claimed is:

1. An Interior panel (1) in combination with a motor vehicle door (10), wherein the interior panel (1) includes a plurality of functional units (11) directly attached thereto, said plurality of functional units including a window opener having guide rails (3, 4) for a window pane (9), a lock (8), an inside-door operating means (7), a mirror-adjustment means, a side-impact protection member (5), a cavity-reinforcement means (2), and a loudspeaker (6), wherein the interior panel (1) is connected in a sealing manner to substantially cover the motor vehicle door (10) and forming a partition between a wet space and a dry space.

2. The combination according to claim 1, wherein each of the functional units are fastened on the interior panel (1) in the form of a static framework (12).

3. The combination according to claim 1, wherein the cavity-reinforcement means (2) and a strut and a side-impact protection member (5) are connected to the interior panel (1).

4. The combination according to claim 1, the guide rails (3, 4) extend transversely and are connected to the cavity reinforcement means (2) in a region of an upper free section (13), said cavity reinforcement means extending longitudinally.

5. The combination according to claim 1, wherein the guide rails (3, 4) are connected to the interior panel (1) in a region of a lower free section (14), with spacer elements disposed there between.

6. The combination according to claim 1, wherein both guide rails (3, 4), are connected to a strut (5).

7. The combination according to claim 1 consisting of one of a plastic and a fiber reinforced material.

8. The combination according to claim 1, wherein the cavity-reinforcement means (2) and a strut (5) and the guide rails (3, 4) are connected to the interior panel (1) by one of screws, clips, and a bond.

9. The combination according to claim 1, wherein at least one of the functional parts (11), are additionally secured on the motor vehicle door (10).

10. An interior panel in combination with a motor vehicle door for a motor vehicle, said interior panel substantially covering said motor vehicle door as an internal lining, said interior panel having a window lifter mechanism and at least one guide rail attached thereto and carried thereon.

11. The interior panel according to claim 10 further comprising a lock attached thereto.

12. The interior panel according to claim 10 further comprising an inside door operating means attached thereto.

13. The interior panel according to claim 10 further comprising a mirror adjustment means attached thereto.

14. The interior panel according to claim 10 further comprising a side impact protection member attached thereto.

15. The interior panel according to claim 10 further comprising a cavity reinforcement member attached thereto.

16. The interior panel according to claim 10 further comprising a loudspeaker attached thereto.

17. The interior panel according to claim 10 in combination with a vehicle door, said interior paneling element further including a lock, an inside door operating means, a mirror adjustment means, a side impact protection member, a cavity reinforcement means and a loudspeaker all attached to said interior panel forming a static framework assembly, said assembly fastened to said vehicle door.

18. A combination vehicle door an interior panel secured thereto, said interior panel comprising:

a shell substantially sealingly covering said vehicle door, said shell having an inner surface and an outer surface;

a horizontally extending cavity-reinforcement member secured directly to said inner surface of said shell along an upper portion thereof;

a side impact strut secured directly to said inner surface of said shell and extending substantially in a direction between diagonally opposed corners of said shell; and a window opener secured to said cavity reinforcement member said side impact strut and said inner surface of said shell; wherein said shell, said cavity reinforcement member said side impact strut and said window opener form a static framework together assembled to said vehicle door and said exterior surface of said shell remaining exposed when said combination vehicle door and said interior panel are assembled.

* * * * *